(12) United States Patent
Saari

(10) Patent No.: US 7,520,251 B2
(45) Date of Patent: Apr. 21, 2009

(54) NON-RECIPROCATING INTERNAL COMBUSTION ENGINE

(76) Inventor: Robert S. Saari, P.O. Box 151, Little Lake, MI (US) 49883

( * ) Notice: Subject to any disclaimer, the term of this patent is extended or adjusted under 35 U.S.C. 154(b) by 0 days.

(21) Appl. No.: 11/797,112

(22) Filed: May 1, 2007

(65) Prior Publication Data

US 2007/0251496 A1    Nov. 1, 2007

Related U.S. Application Data

(60) Provisional application No. 60/796,357, filed on May 1, 2006.

(51) Int. Cl.
*F02B 57/06* (2006.01)
*F02B 57/00* (2006.01)
*F02B 75/22* (2006.01)
(52) U.S. Cl. ............... 123/44 C; 123/43 R; 123/44 R; 123/55.2
(58) Field of Classification Search ............... 123/44 A, 123/44 R, 43 R, 44 C, 44 D, 52.1, 55.2, 55.7; 91/491
See application file for complete search history.

(56) References Cited

U.S. PATENT DOCUMENTS

| | | | | | |
|---|---|---|---|---|---|
| 1,456,220 | A | * | 5/1923 | Brockway | ................... 180/223 |
| 2,103,787 | A | * | 12/1937 | McCrary | ................... 123/44 A |
| 2,943,453 | A | * | 7/1960 | Jonkers et al. | ................... 62/6 |
| 3,517,651 | A | * | 6/1970 | Graybill | ................... 123/44 R |
| 3,931,809 | A | * | 1/1976 | Corte et al. | ................ 123/43 R |
| 3,971,349 | A | * | 7/1976 | Froumajou | ................... 123/44 D |
| 5,954,017 | A | * | 9/1999 | Federowicz | ................ 123/44 R |
| 6,378,470 | B1 | * | 4/2002 | Keever | ....................... 123/44 R |
| 6,591,791 | B2 | * | 7/2003 | De Bei | ....................... 123/44 R |
| 2005/0109294 | A1 | * | 5/2005 | Wondergem et al. | ....... 123/44 R |

* cited by examiner

*Primary Examiner*—Michael Cuff
*Assistant Examiner*—Ka Chun Leung
(74) *Attorney, Agent, or Firm*—Edward E. Roberts

(57) ABSTRACT

A piston type internal combustion engine having a fixed position stub shaft mounted on a base. The piston, piston pin and piston rod rotate about this fixed position shaft. The piston assembly does not reciprocate. The cylinder block assembly is mounted to an output shaft whose center line does not coincide with the center line of the axis of the fixed position shaft such that it is offset from the fixed position shaft. The block assembly consists of cylinders, end cap, air intake shroud and exhaust collecting hood. The cycle of combustion is two, three or four cycle regulated by the fuel injection and/or spark plug firing sequence. Air is drawn through a filter into a turbo charge type air intake shroud. Air is accelerated through openings in the cylinders and pistons. Fuel is pumped through the output shaft and to the fuel injectors. Exhaust is dispatched to a rotating collector having a labyrinth type seal, then to a non-rotating hood attached to the base and through an exhaust port.

6 Claims, 4 Drawing Sheets

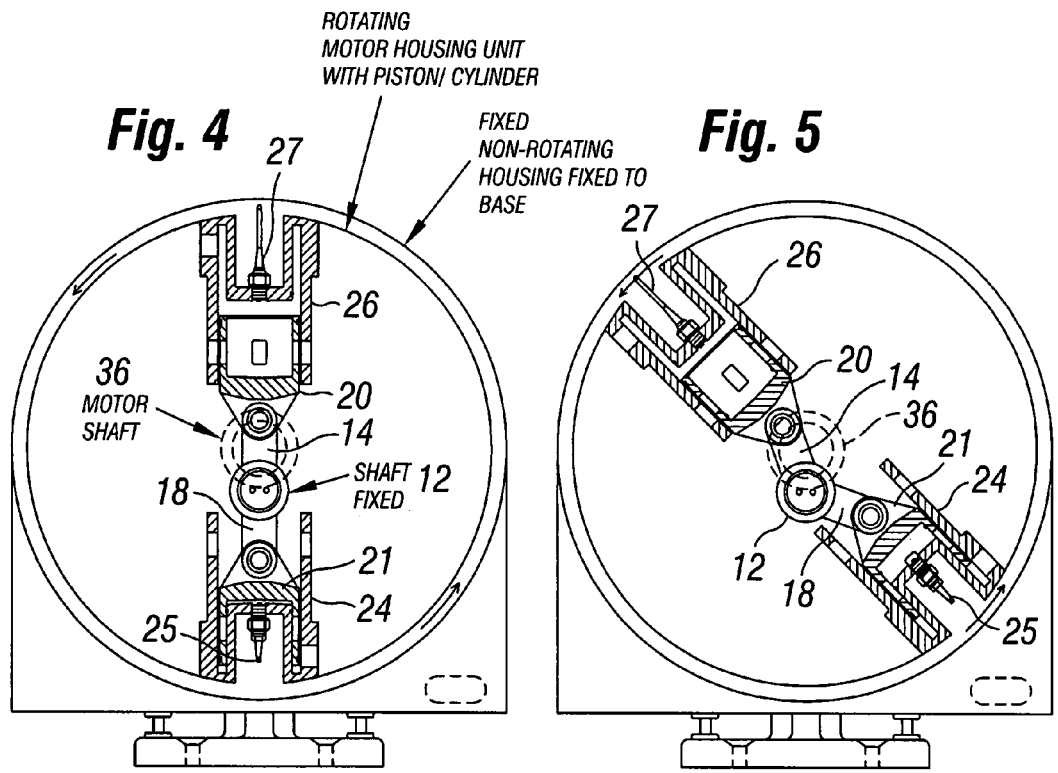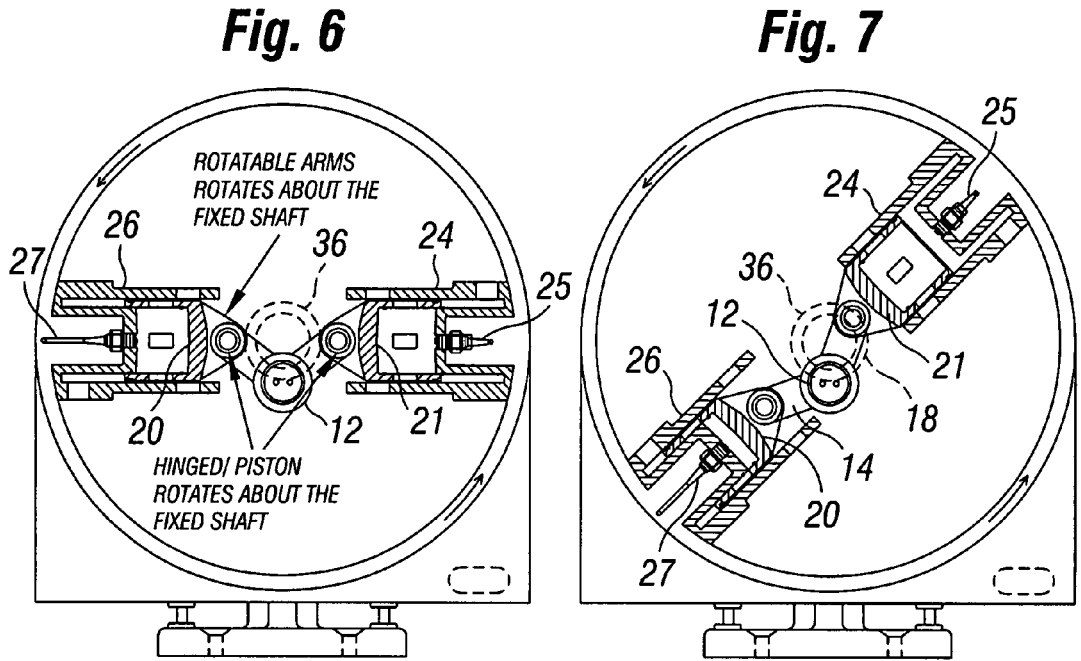

NON-RECIPROCATING INTERNAL COMBUSTION ENGINE

CLAIM FOR BENEFIT OF EARLIER FILING DATE

The present utility patent application claims the benefit of U.S. Provisional Application No. 60/796,357 on May 1, 2006 entitled Variable Cycle Internal Combustion Engine. The present utility application has the same inventor and subject matter as the aforesaid Provisional Application.

BACKGROUND

The background of the invention will be discussed in two parts.

1. Field of the Invention

The present invention relates in general to internal combustion engines, and more particularly to a novel piston type internal combustion engine having a fixed position stub shaft mounted on a base and wherein the piston assembly does not reciprocate.

2. Related Art

For more than 100 years the piston type internal combustion engine has mainly consisted of a stationary block, cylinders, crankshaft, cam shaft, exhaust and intake valves. The efficiency has been very low due to kinetic friction loss and reciprocal movement of valves, rocker arms, pistons, piston pins and rods. Most improvements in the design of the piston type internal combustion engine have done little to improve the dynamics of these engines. The present invention improves the efficiency of the internal combustion engine by eliminating all reciprocal moving parts and reducing the number of parts. The cylinder block assembly rotates with a significant mass acting as a flywheel, further saving energy by allowing a slow idle RPM when power is not required. The rotating block and rotating air intake shroud with vanes increasing air velocity into the combustion chamber add to energy savings. Further energy savings are achieved through the large area exhaust outlets, reducing the work required to pump exhaust gas out. An example of an internal combustion engine having a rotatable cylinder block is shown and described in U.S. Pat. No. 6,220,208 issued to van de Verve on 24 Apr. 2001. Van de Verve discloses an internal combustion diesel engine including cylinder block having at least one cylinder in which a piston with a connecting rod connected thereto are movably provided, the at least one cylinder arranged in a cylinder block which is rotatable about its axis. The end of the connecting rod remote from the piston is attached to a stationary shaft whose center is line does not coincide with the center line of the axis of the rotatable cylinder block.

Considering the shortcomings and deficiencies in the prior art, there exists a need for improvements of the design of piston type internal combustion engines to increase efficiency by improving the dynamics of these engines whereby there is decreased kinetic friction loss and reciprocal movement of valves, rocker arms, pistons, piston pins and piston rods.

It is thus an object of the present invention to provide a new and improved piston type internal combustion engine having a fixed position stub shaft mounted on a base and wherein the piston, piston pin and piston rod rotate about this fixed position shaft. It is another object of the invention to provide a piston assembly that does not reciprocate. Other objects, aspects, features and advantages of the invention will become apparent from a reading of the specification taken in conjunction with the drawings.

SUMMARY

The foregoing and other objects and advantages of the invention are accomplished by an improved piston type internal combustion engine having a fixed position stub shaft mounted on a base wherein the piston, piston pin and piston rod assembly rotate about the fixed shaft. In that it rotates about the fixed shaft, the piston assembly does not reciprocate. The cylinder block assembly is mounted to a power output shaft offset from the fixed position stub shaft. The block assembly consists of cylinders, end cap, air intake shroud and exhaust collecting hood. The cycle of combustion can be two, three or four cycle regulated by the fuel injection and/or spark plug firing sequence. Air is drawn through a filter and a turbo charged air intake shroud and accelerated through openings in the cylinders and pistons. Fuel is pumped through a channel interior of the output shaft and through the fuel injectors, combining with air for combustion. Lubrication is provided to the piston rods through channels in the fixed position shaft. Exhaust is dispatched to a rotating collector having a labyrinth type seal, then to a non-rotating hood attached to the base and then through an exhaust port.

DRAWINGS

FIG. 4 is a cross-sectional front view of the invention illustrating the engine pistons aligned shortly before the starting position;

FIG. 5 is a cross-sectional front view of the invention illustrating counter-clockwise rotation of the pistons;

FIG. 6 is a cross-sectional front view of the invention illustrating further counter-clockwise rotation of the pistons;

FIG. 7 is a cross-sectional front view of the invention illustrating still further counter-clockwise rotation of the pistons;

LIST OF REFERENCE NUMERALS UTILIZED IN THE APPLICATION AND DRAWINGS

Figure 1:
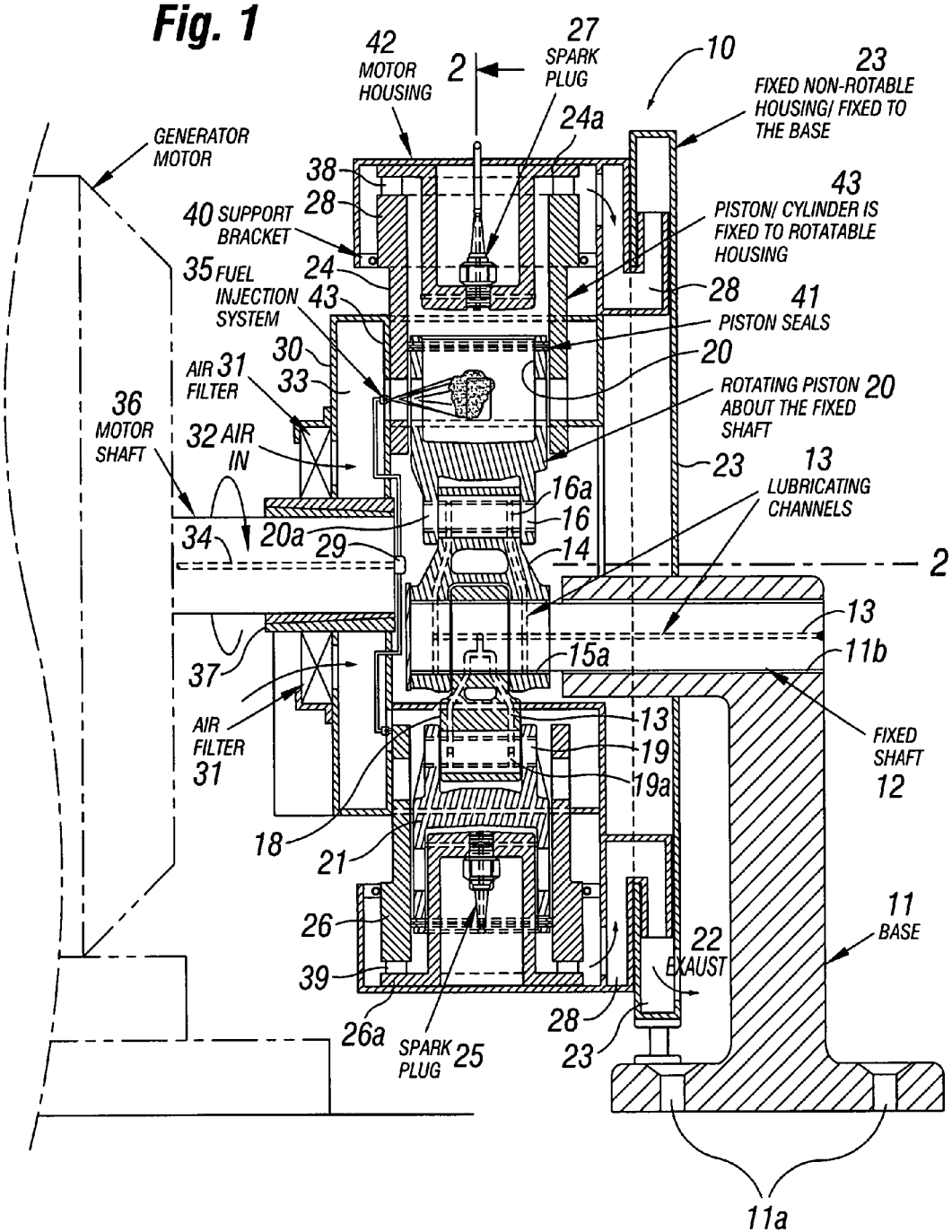
FIG. 1 illustrates in cross-sectional view the non-reciprocating internal combustion engine of the invention.

Following is a list of reference numerals that represent like elements of the engine of the invention in the several views.

10. Engine of the invention
11. Fixed shaft support or base
11a. Base mounting means
11b. Aperture for fixed shaft 12
12. Fixed shaft
13. Bearing lubrication channel (in phantom)
14. Piston rod, split type
15. Apertures in piston rod 14 for receiving shaft 12
15a. Bearings in apertures 15 for shaft 12
16. Piston pin for piston rod 14
16a. Lubrication grooves for piston pin 16
17. Aperture in piston rod 14 for receiving piston pin 16
17a. Bearings in aperture 17 for piston pin 16
18. Piston rod, straight type
18a. Aperture in piston rod 18 for receiving fixed shaft 12
18b. Aperture in piston rod 18 for receiving piston pin 19
18c. Bearings in aperture 18a for shaft 12
18d. Bearings in aperture 18b for piston pin 19
19. Piston pin for piston rod 18

19a. Lubrication grooves for piston pin 19
20. Piston for engagement with split type piston rod 14
20a. Apertures in piston 20 for receiving piston pin 16
21. Piston for engagement with piston rod 18
21a. Apertures in piston 21 for receiving piston pin 19
22. Exhaust port
23. Exhaust collector
24. Cylinder #1
24a. Cylinder #1 end cap
25. Spark plug #1
26. Cylinder #2
26a. Cylinder #2 end cap
27. Spark plug #2
28. Rotating exhaust hood
29. "T" coupling
30. Rotating air intake shroud
31. Air intake filter
32. Air intake port
33. Air intake vane
34. Fuel intake line
35. Fuel injector system
36. Output power or motor shaft
37. Locking shaft coupling
38. Spacer washers #1
39. Spacer washers #2
40. Support brackets
41. Piston seals
42. Rotatable motor housing affixed to shaft 36
43. Means for affixing cylinder to rotatable motor housing 42

DESCRIPTION

Having reference now to the drawings, the internal combustion engine of the invention will be illustrated and described. Taking FIGS. 1, 2 and 3 in conjunction, FIG. 1 illustrates in cross-section the engine of the invention taken along line 1-1 of FIG. 2, FIG. 2 illustrates in a partially cutaway view the engine taken along line 2-2 of FIG. 1, and FIG. 3 is a cross-sectional partially exploded view of the of the invention as illustrated in FIG. 1.

Figure 2:
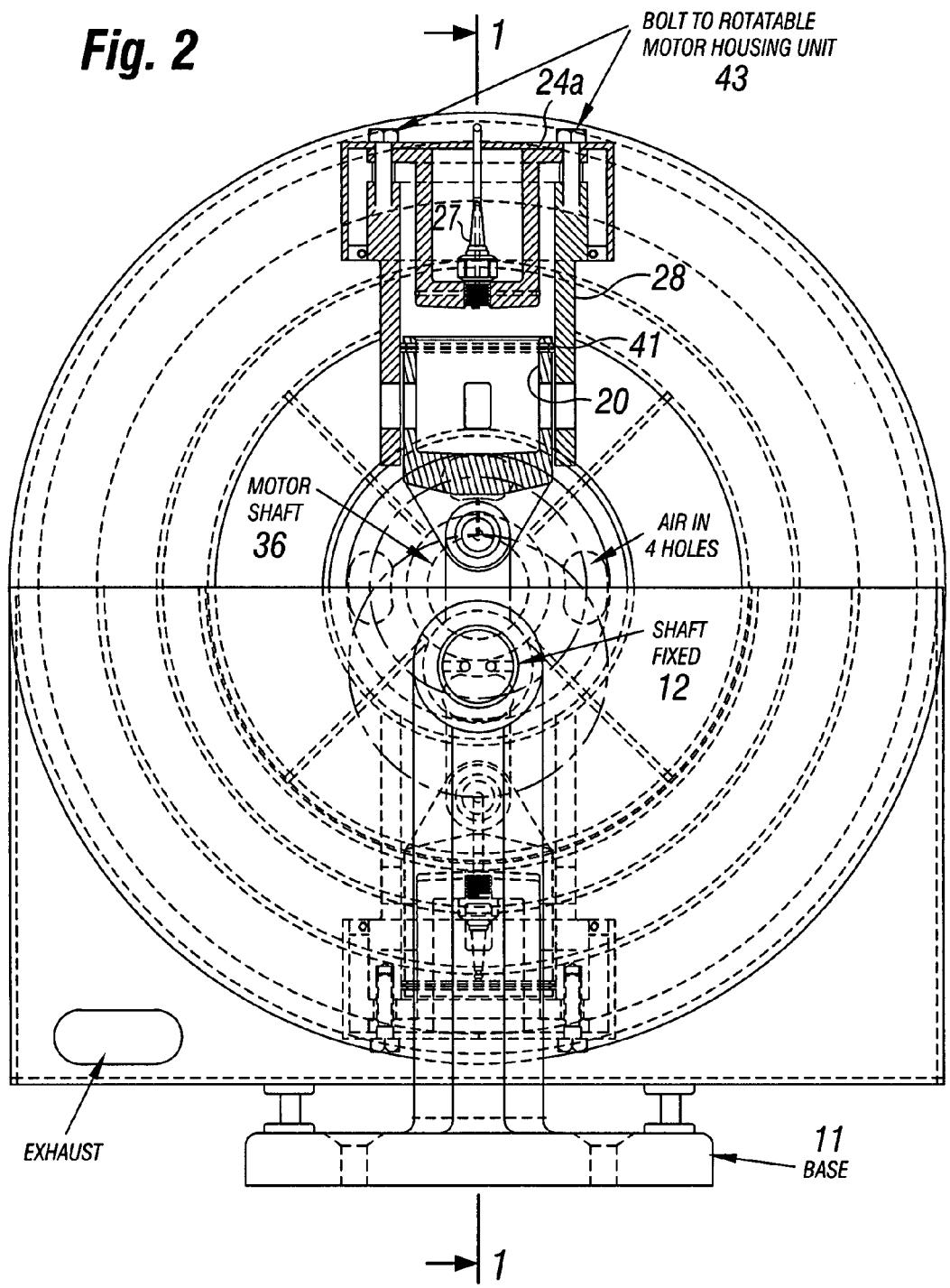
FIG. 2 illustrates in a partially cutaway view the internal combustion engine of the invention taken along line 2-2 of FIG. 1.
Figure 3:
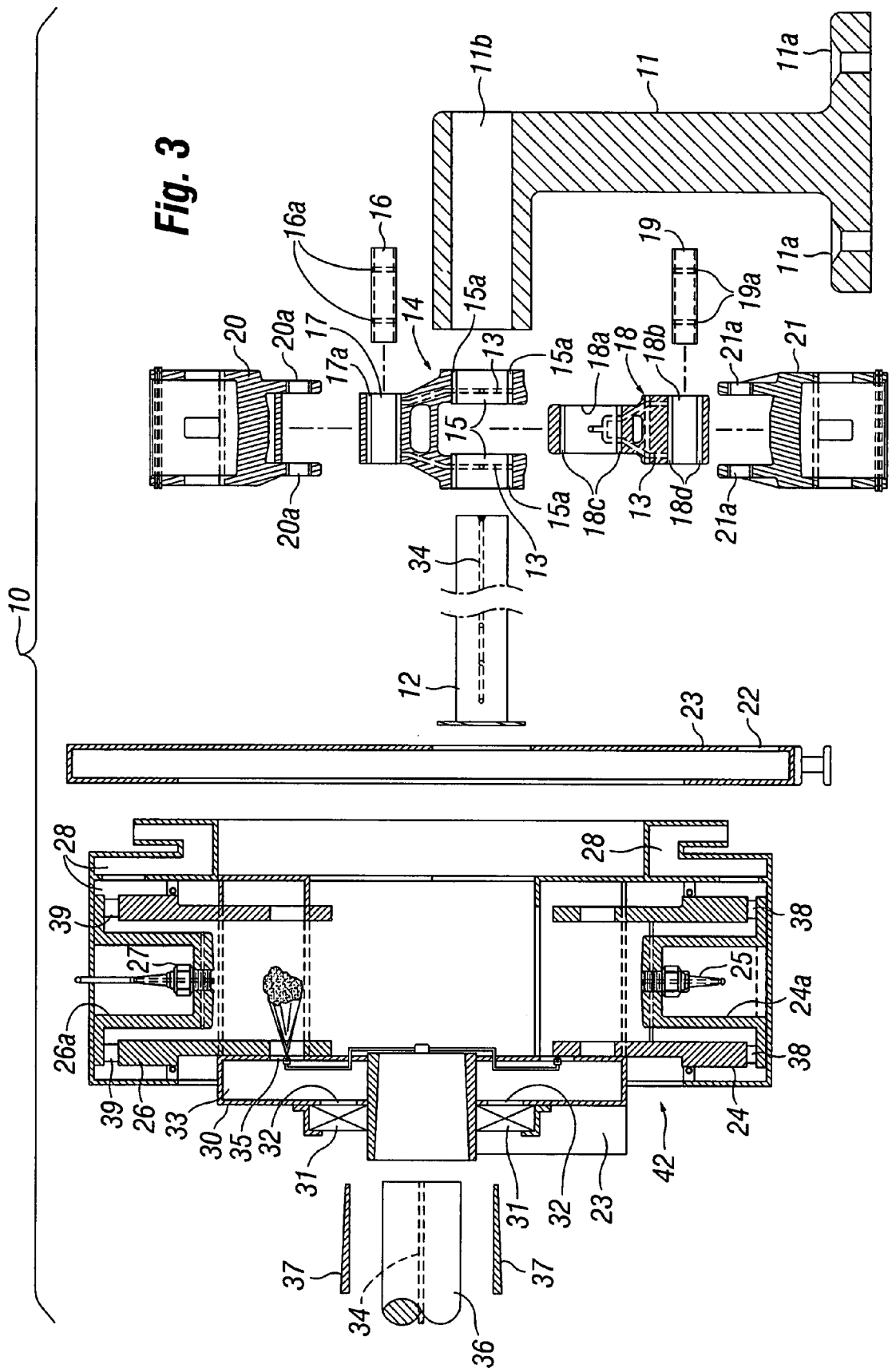
FIG. 3 is a cross-sectional partially exploded view of the of the invention as illustrated in FIG. 1.

As illustrated variously in FIGS. 1-3 the engine of the invention, generally designated 10, in brief includes a fixed position stub shaft 12 mounted on a base 11 wherein the two piston assembly rotates about shaft 12 but does not reciprocate. The cylinder block assembly is affixed to rotating shaft 36 that is offset from the fixed, or set, shaft 12. Air is drawn through air intake filter 31 into the turbo charge type air intake shroud 30 and then on to the pistons 20, 21 through openings in the cylinders 24, 26 and pistons 20, 21. Fuel is pumped through fuel line 34 (in phantom) that is channeled interior of shaft 36 and through "T" coupling 39 to the timed fuel injector system 35 (one injector shown), and then combined with air for combustion. Fuel is provided to fuel line 34 of shaft 36 by means of a rotating fuel coupling (not shown). Lubrication is provided initially through fixed shaft 12 and then to the piston rods 14, 18 and bearings 15a and 17a, respectively, through lubrication channels 13 (in phantom). Exhaust mixture is dispatched substantially without obstruction from the engine 10, as indicated by the arrows in FIG. 1, the mixture being passed from the cylinders 24, 26 to the rotating exhaust collector 28 (having a labyrinth type seal), then into non-rotating hood 23 and finally exhausted through exhaust port 22. Hood 23 is fixedly attached to base 11.

The cycle of combustion shown in the drawings is two cycle regulated by the fuel injection of fuel injection system 35 and/or the spark sequence of spark plugs 25, 27. It is to be understood that the cycle of combustion could be multi-cycle, such as three or four cycle, in accordance with the invention. Spark plugs 25, 27 and fuel injector system 35 are timed through an electric pick-up timing distributor (not shown) mounted on power take-up shaft 36 providing for timing of fuel injection and spark plug firing sequence.

The two piston assembly is comprised of piston 20 with split type piston rod 14 and piston pin 16, and piston 21 with straight type piston rod 18 and piston pin 19. Piston rod 14 includes apertures 15 and associated bearings 15a in the split sections thereof for receiving shaft 12 therethrough. Piston pin 16 includes lubrication grooves 16a fed by lubrication channels 13. Piston rod 18 includes apertures 18a for receiving shaft 12 and 18b for receiving piston 19. Apertures 18a and 18b have associated bearings 18c and 18d, respectively. and piston pin 19 includes lubrication grooves 19a fed by lubrication channels 13. Piston 20 has apertures 20a for alignment with aperture 17 of split type piston rod 14 and for receiving piston pin 16. Piston 21 has apertures 21a for alignment with aperture 18b of straight type piston rod 18 and for receiving piston pin 19. Piston rod 18 is inserted into split piston rod 14 to place aperture 18a in alignment with apertures 15 for receiving shaft 12 therethrough.

The rotating cylinder block assembly, or motor housing, 42 is fixedly and symmetrically mounted to the power take-off shaft 36 and includes cylinders 24, 26, air intake shroud 30, air intake vane 33, exhaust port 22, rotating exhaust hood 28, air filter 31, and spacer washers 38, 39, Cylinder 24 includes cylinder end cap 24a and spark plug 25 and cylinder 26 includes cylinder end cap 26a and spark plug 27. Cylinders 24 and 26, including their mounting means to the rotating housing 42, are substantially identical. The cylinder block assembly 42 is affixed to shaft 36 with locking shaft coupling 37.

Thus, pressurized fuel passes through channeled fuel 34 of power shaft 36 to the electrically powered and timed fuel injectors of injector system 35. Air is drawn through air filter 31 and air intake port 32 and accelerated through rotating air intake shroud 30 and air intake vanes 33. By means of a timing distributor fuel injection and ignition spark are timed to thereby provide for coordinated fuel injection and firing sequence. Variation of the compression ratio for different fuels can be accomplished by varying the openings between cylinders 26, 28 and cylinder caps 24a, 26a such as by varying the number of spacer washers 38, 39. Fixed position shaft 12 is affixed to and supported by fixed shaft support 11. Rotatable housing 23 is attached to fixed shaft support 11. Piston rod bearings 17a, 18a and fixed shaft bearings 15a are lubricated through lubricating ports 13 and 13a. Piston rod bearings 17a, 18d and fixed shaft bearings 15a, are conventional roller type bearings. Piston rod 14 has a split mounting to fixed shaft 12. Pistons 20, 21 are of cup shape with fuel and air supply openings around its periphery. Cylinders 24, 26 are cylindrical in shape and have fuel and air supply openings aligned with openings in respective pistons 20, 21. Cylinder end caps 24a, 26a are bolted o otherwise affixed to their respective cylinders.

Likewise, spark plugs 25, 27 are attached to their respective cylinder end caps 24a, 26a, respectively. The pistons 20, 21, cylinders 24, 26, and cylinder end caps 24a, 26a are of conventional crankshaft engine design. Rotating exhaust hood 28 is affixed to the cylinder block assembly. Exhaust collector 23 is fastened to base 11. Rotating exhaust hood 28 and exhaust collector 23 have interlocking cylindrically shaped plates to form a labyrinth exhaust seal. Exhaust is discharged through exhaust port 22 to a conventional exhaust converter (not shown). Piston pins 16, 19 are fastened respectively to pistons 14, 18. The fuel pump, starter and alternator can be of conventional type and are not shown.

FIG. 2 is a partially cutaway view of the engine 10 of the invention taken along line 2-2 of FIG. 1. As illustrated, the motor housing 42 is in the position wherein the fixed shaft 12, motor shaft 36 and cylinders 24, 26 with associated pistons 20, 21 and piston rods 14 and 18, respectively, are in vertical alignment. By reference to FIGS. 4-7 operation of the engine 10 will be explained starting from this aligned position.

FIGS. 4-7 illustrate in cross-sectional front view the alignment of the engine pistons 20, 21 during operation of the engine 10. FIG. 4 illustrates the condition wherein the motor starter (not shown) has rotated the motor housing 42 to the vertical alignment position as shown in FIG. 3. Shortly after rotating from this position, because of the offset between the fixed shaft 12 and the motor shaft 34, piston rods 14, 18 become slightly off vertical. Then, with timed firing of sparkplug 27 the motor housing 42 is caused to rotate as indicated in FIGS. 5-7, thereby rotating attached motor shaft 34. With continued rotation as indicated cylinder 24 is caused to rotate 180 degrees after which sparkplug 25 is in position for timed firing. With timing of fuel injection coupled with timing of firing of the sparkplugs 25, 27 the motor housing 42 and attached motor shaft 34 continues to rotate. It is thus seen that the piston assembly of pistons 20, 21 rotates about fixed shaft 12, the advantage being that the motor housing 42 is balanced and more efficient.

From the foregoing description, it will be apparent that the invention provides a new, improved, and more efficient piston type internal combustion engine having a piston assembly that does not reciprocate, and a fixed position stub shaft mounted on a base wherein the piston, piston pin and piston rod rotate about this fixed position shaft.

Although an embodiment of the invention has been shown and described, other embodiments can be devised by those skilled in the art that would fall within the scope of the invention. Accordingly, the scope of the invention should not be construed as limited to the specific embodiment herein depicted and described.

What is claimed is:

1. An internal combustion engine comprising:
   a fixed position shaft mounted on a base;
   an output shaft having a center line axis that does not coincide with the center line axis of said fixed shaft;
   a piston assembly including first and second piston rods having first ends rotatably mounted to said fixed shaft and second ends rotatably mounted to first and second pistons;
   a cylinder housing including first and second cylinders having first and second spark plugs, said cylinders configured for receiving said first and second pistons respectively, said cylinders affixed within said housing and said housing affixed to said output shaft;
   said piston assembly is accommodated in said cylinder block housing;
   fuel is provided to said piston assembly through a channel interior of said output shaft; and
   whereby timed firing of said spark plugs causes said piston assembly to rotate about said fixed shaft and said housing to rotate about said output shaft.

2. The engine of claim 1 wherein lubrication to said piston assembly is provided through channels fed by a channel in said fixed shaft.

3. The engine of claim 1 further including means for injecting said fuel into said cylinder housings and a timing distributor wherein the injection of said fuel and the firing of said spark plugs is timed thereby providing for coordinated fuel injection and spark plug firing sequence.

4. The engine of claim 1 further including:
   an exhaust means for exhausting combustion gases from said cylinder housing, said exhaust means including an exhaust collector mounted to a rotatable exhaust hood with an exhaust port fixedly mounted to said base and an exhaust hood fixedly mounted to said cylinder housing, said exhaust hood having a labyrinth seal for transmitting said gases to said exhaust collector.

5. An internal combustion engine comprising:
   a base mounted fixed support shaft and an output motor shaft, said support shaft supporting a rotatable piston assembly thereon and said motor shaft fixedly connected to a cylinder housing;
   said output motor shaft having a center line axis that does not coincide with the center line axis of said support shaft;
   said piston assembly including a split piston rod and a straight piston rod engaged at first ends and having aligning apertures for rotatably receiving said support shaft, said piston rods at second ends rotatably connected to respective pistons;
   said cylinder housing configured for encompassing said piston assembly and having an affixed cylinder block assembly including a fuel ignition means mounted therein;
   timed firing of said ignition means simultaneously rotates said piston rods about respective piston pins and about said fixed shaft thereby to rotate said cylinder block housing and said offset mounted output shaft;
   spacer means for varying the compression ratio of the engine cylinders by varying the space between said cylinder block and the end caps of said cylinders; and
   wherein lubrication to said piston assembly is provided through channels fed by a channel in said fixed shaft and includes radially extending grooves for lubricating purposes.

6. An internal combustion engine comprising:
   a base mounted fixed support shaft and an output motor shaft, said support shaft supporting a rotatable piston assembly thereon and said motor shaft fixedly connected to a cylinder housing;
   said output motor shaft having a center line axis that does not coincide with the center line axis of said support shaft;
   said piston assembly including a split piston rod and a straight piston rod engaged at first ends and having aligning apertures for rotatably receiving said support shaft, said piston rods at second ends rotatably connected to respective pistons;
   said cylinder housing configured for encompassing said piston assembly and having an affixed cylinder block assembly including a fuel ignition means mounted therein;
   timed firing of said ignition means simultaneously rotates said piston rods about respective piston pins and about said fixed shaft thereby to rotate said cylinder block housing and said offset mounted output shaft;
   fuel is provided to said piston assembly through a channel interior of said output shaft; and
   wherein lubrication to said piston assembly is provided through channels fed by a channel in said fixed shaft and includes radially extending grooves for lubricating purposes.

* * * * *